US006912710B2

(12) United States Patent
Broussard et al.

(10) Patent No.: US 6,912,710 B2
(45) Date of Patent: Jun. 28, 2005

(54) ROUND-TRIP MAINTENANCE OF SOFTWARE CONFIGURATION

(75) Inventors: Scott J. Broussard, Cedar Park, TX (US); Samuel O. Isokpunwu, Austin, TX (US); Eduardo N. Spring, Round Rock, TX (US); Michael John Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/062,363

(22) Filed: Jan. 31, 2002

(65) Prior Publication Data

US 2003/0159130 A1 Aug. 21, 2003

(51) Int. Cl.[7] .................................................. G06F 9/44
(52) U.S. Cl. ........................ 717/170; 717/120; 717/118; 719/328
(58) Field of Search ................................. 717/120, 170, 717/118, 147; 719/318, 328

(56) References Cited

U.S. PATENT DOCUMENTS 6,789,254 B2 * 9/2004 Broussard .................... 717/147
2003/0195997 A1 * 10/2003 Ibert et al. ................... 709/318

OTHER PUBLICATIONS

Sasaki, Hiroshi, "Java Call Control v1.0 to Session Initiaion Protocol Mapping" JAIN Community, Sun Microsystems, Oct. 25, 2001, pp. 1–76.*
Subasinghe, Chammika, "Java Call Control v1.0 to H.323 API Mapping", JAIN Community, Sun Microsystems, Oct. 25, 2001, pp. 1–56.*

* cited by examiner

*Primary Examiner*—St. John Courtenay, III
(74) *Attorney, Agent, or Firm*—John R. Biggers; Mark S. Walker; Biggers & Ohanian, LLP

(57) ABSTRACT

A method of software development comprising the steps of determining, through Java reflection API calls, a current software signature for each Java object, from a Java software application comprising Java application code, to be administered by a software development wizard, retrieving from a deployment descriptor a Java object deployment description for each said Java object, and detecting changes in the Java application code, wherein detecting changes includes contrasting the current software signatures and the retrieved Java object deployment descriptions. Exemplary embodiments also include displaying, for user revision through a user interface, representations of the detected changes in the Java application code, wherein user revision includes user confirmation of detected changes, recording user revisions in the deployment descriptor, and conforming the Java application code to the user revisions.

24 Claims, 3 Drawing Sheets

ROUND-TRIP MAINTENANCE OF SOFTWARE CONFIGURATION

BACKGROUND OF THE INVENTION

1. Field of the Invention

The field of the invention is software development, or, more specifically, automated tools for support of software development, or, even more specifically, round trip maintenance of software configuration.

2. Description of the Related Art

Information from the software development utilities often known as 'wizards' and from 'IDEs' or Integrated Development Environments is gathered from programmers and used to generate software. Some of that information, such as data comprising deployment descriptors, is saved in files or repositories separate from the source code. However the flexibility of modem development tools allows programmers to make further changes in various places without going through the wizards of IDEs that would ordinarily track and integrate such changes, therefore making it difficult and complex for the development tools, particularly the plugin-type tools, such as wizards that attempt to supplement IDE functionality, to keep all the separate information such as deployment descriptors in synchronization with the source code.

It is generally the function of tools such as wizards and IDEs to keep a programming environment in a consistent and coherent state. Changes in one place or the other by the base tool, or other tools used directly by a programmer outside a base tool, in combination, can create inconsistencies where the appropriate collateral changes, that the wizard would normally require to be made, are not made.

It is a particular problem of prior art of software development that, with respect to software applications large enough to be useful in modem software environments, programmers find it very difficult to know all the implications of changes in particular segments of source code. That is, programmers may not know or understand how changes in source code affect other software components, without excessive amounts trial and error. Automated synchronization of source code and related software development tools such as deployment descriptors, for example, with changes made by programmers outside a toolset or programming environment, would be very advantageous, tremendous time savers and proficiency aids for programmers.

SUMMARY OF THE INVENTION

Exemplary embodiments of the invention include methods of software development. Typical embodiments include determining, through Java reflection API calls, a current software signature for each Java object, from a Java software application including Java application code, to be administered by a software development wizard. Typical embodiments include retrieving from a deployment descriptor a Java object deployment description for each said Java object. Exemplary embodiments typically include detecting changes in the Java application code, in which detecting changes includes contrasting the current software signatures and the retrieved Java object deployment descriptions, and displaying, for user revision through a user interface, representations of the detected changes in the Java application code, where user revision includes user confirmation of detected changes. Exemplary embodiments typically include recording user revisions in the deployment descriptor and conforming the Java application code to the user revisions.

In exemplary embodiments of the invention, a deployment descriptor typically comprises an XML file. Some embodiments include converting the XML file to a DOM object and providing, in the form of entries in the DOM object, a list of the Java objects to be administered by a software development wizard. Such embodiments typically include storing detected changes in the form of entries in the DOM object.

In exemplary embodiments of the invention, a deployment descriptor includes XML deployment descriptions. Exemplary embodiments typically include providing a list of the Java objects to be administered by a software development wizard and converting the XML deployment descriptions to a DOM object in dependence upon the list of Java objects to be administered by a wizard, whereby the only XML deployment descriptions converted into the DOM object are XML deployment descriptions for Java objects to be administered by a wizard. Some embodiments include storing detected changes in the form of entries in the DOM object.

The foregoing and other objects, features and advantages of the invention will be apparent from the following more particular description of exemplary embodiments of the invention, as illustrated in the accompanying drawings wherein like reference numbers represent like parts of the invention.

DETAILED DESCRIPTION OF EXEMPLARY EMBODIMENTS

Introduction

Figure 1:
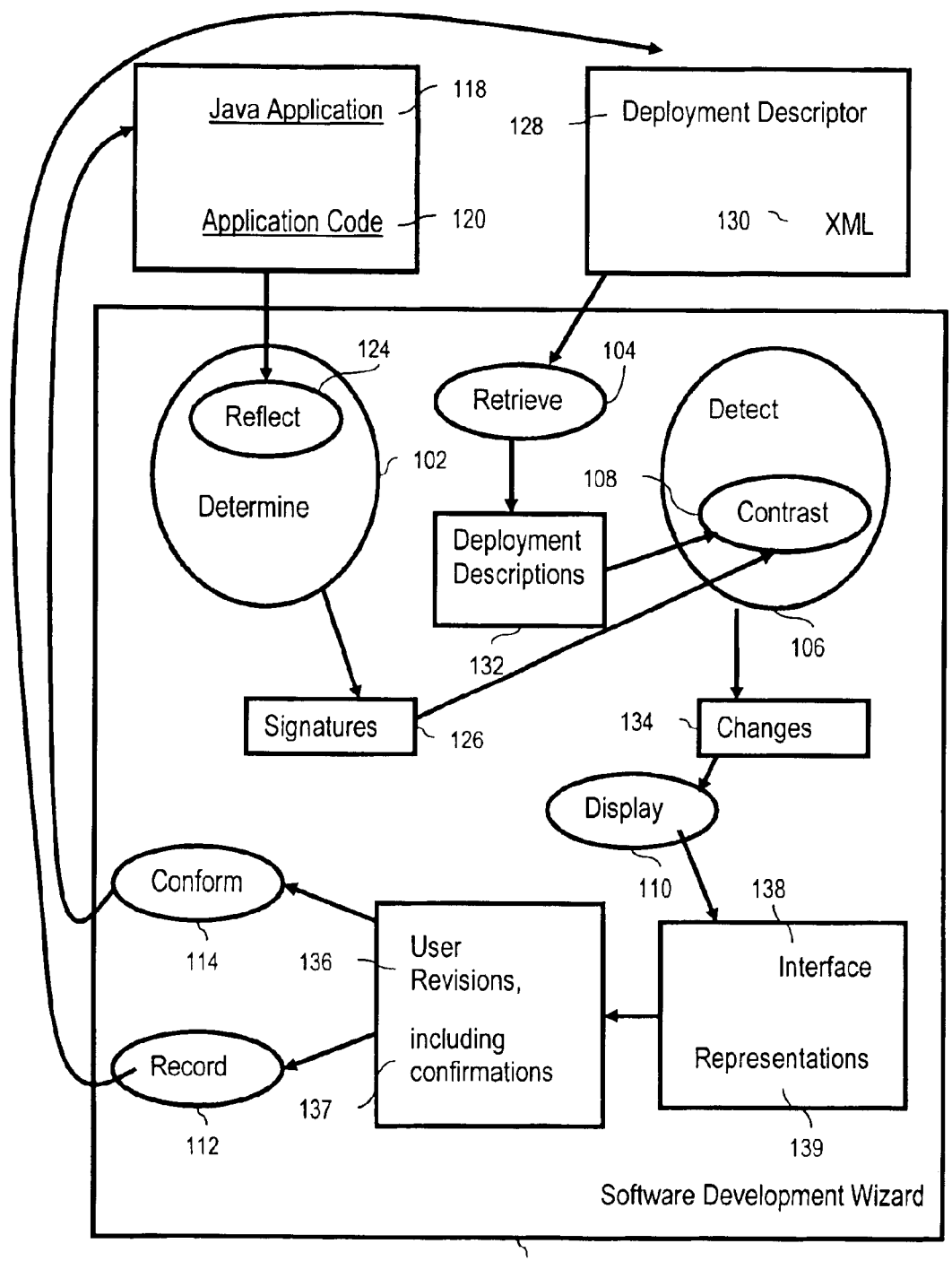
FIG. 1 is a control flow diagram illustrating exemplary embodiments of the invention.

The present invention is described primarily in terms of methods for software development, methods for automated tools supporting software development, or methods of round trip maintenance of software configuration. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

"Browser" means a web browser, a software application for locating and displaying web pages. Typical browsers today can display text, graphics, audio and video.

"Coupled for data communications" means any form of data communications, wireless, infrared, radio, internet protocols, HTTP protocols, email protocols, networked, direct connections, dedicated phone lines, dial-ups, and other forms of data communications as will occur to those of skill in the art.

"Deployment descriptor" refers to an XML based definition file that describes how a software package will be deployed or put into service on a server. Deployment descriptors are well defined data structures known and required by server execution environments, such as the execution environments on web servers and Telecom application servers.

"DOM" stands for Document Object Model, a specification for representing objects in documents, particularly HTML and XML documents. Represented objects include text, images, headers, links, and so on. The DOM defines attributes associated with each object and how the objects and attributes are manipulated. Dynamic HTML ("DHTML") uses the DOM to dynamically change the appearance of Web pages after downloads to browsers. Many embodiments of the present invention take advantage of the DOM's ability to represent objects by storing in a DOM document representations of Java objects. To commemorate that the DOM documents used in typical embodiments of the present invention are usually implemented as data structures in computer memory, a DOM document is generally referred to in this specification as a "DOM object."

In this specification, the terms "member variable," "field," "data element," and "attribute" are used as synonyms, referring to individual elements of digital data. An aggregation of data elements are referred to as a "record" or a "data structure." An aggregation of records is referred to as a "file" or a "table." An aggregation of files or tables is referred to as a "database." Definitions of complex data structures that include member methods, functions, or software routines in addition to data elements are referred to as "classes." An instance of a complex data structure is referred to as an "object" or a "class object."

"Introspection" means inspecting or examining Java application code to determine the characteristics of Java objects comprised with the code. Introspection is typically carried by use of calls to member methods in the standard Java reflection API. The reflection API represents, or reflects, the classes, interfaces, and objects in the current Java Virtual Machine. The reflection API is useful for development tools such as debuggers, class browsers, GUIs, and wizards. With the reflection API, programmers can, among other things, determine the class of an object; get information about a class's modifiers, fields, methods, constructors, and superclasses; find out what constants and method declarations belong to an interface; create an instance of a class whose name is not known until runtime; get and set the value of an object's field, even if the field name is unknown to your program until runtime; invoke a method on an object, even if the method is not known until runtime; create a new array, whose size and component type are not known until runtime, and then modify the array's components.

"JAIN," a trademark of Sun Microsystems, is "Java Integrated Networks." Sun Microsystems supports a 'JAIN initiative,' an industry effort to develop de facto standards for integrated telecommunications networks. The JAIN initiative aims to develop APIs for integrated networks, including protocol APIs for interfaces to wire line, wireless, and IP signaling protocols; and application APIs for service creation within Java frameworks spanning all subsidiary protocols covered by JAIN protocol APIs. The JAIN initiative and JAIN APIs for integrated networks are described in detail in a white paper from Sun Microsystems, Inc., 901 San Antonio Road, Palo Alto, Calif. 94303. The white paper is entitled The JAIN APIs: Integrated Network APIs for the Java Platform. The white paper is available at the URL: http://java.sun.com/products/jain/. The white paper is incorporated by reference into this specification.

"SLEE" servers in typical embodiments of the present invention are implemented in JAVA using the JTAPI, the Java Telephony API. "JAIN SLEE," or the JAIN Service Logic Execution Environment, an element of Sun Microsystems' industry-oriented de facto standard JAIN initiative, is a set of interfaces and standards for telecommunications and Internet operations within carrier grade telecommunications networks and Internet networks. JAIN-compliant telecommunications services are tested and deployed in the JAIN Service Logic Execution Environment.

A "SLEE server" is a server operating portable telecommunication services and application frameworks in a JAIN SLEE compliant execution environment.

"JTCAP" stands for 'Java Transaction Capabilities Application Part,' a standard protocol layer in the so-called JAIN SS7. JTCAP enables a range of transaction-based applications such as "800" Number Translation, Calling Name Delivery and Local Number Portability.

"SS7" is 'Signaling System 7,' a standard architecture for performing out-of-band signaling in support of call-establishment, billing, routing, and information-exchange functions in the public switched telephone network ("PSTN"). SS7 identifies functions to be performed by a signaling-system network and protocols to enable their performance.

"JCC," short for 'JAIN Call Control,' is also a JAIN telecom standard supporting an open API.

A "JavaBean" is a software element implementing a specification developed by Sun Microsystems that defines how Java objects interact. An object that conforms to this specification is called a JavaBean. JavaBeans are similar to an ActiveX controls in that a JavaBean can be used by any application that understands the JavaBeans format. JavaBeans are dissimilar to ActiveX controls in that: ActiveX controls can be developed in any programming language but can execute only on Windows platforms. JavaBeans can be developed only in Java but can run on any platform.

The term "network" is used in this specification to mean any networked coupling for data communications. Examples of networks useful with the invention include intranets, extranets, internets, local area networks, wide area networks, and other network arrangements as will occur to those of skill in the art.

"Network address" means any network address useful for data communications. Network addresses useful with various embodiments of the invention include local internet protocol addresses, private internet protocol addresses, and temporary Internet addresses assigned to a web client by a DHCP server, and permanent, official registered Internet addresses associated with domain names.

A "servlet" is, in effect, an applet that runs on a server. Which is to say, that a servlet is an element of application software designed to be executed from within a server rather than having the ability to execute independently from an operating system. Servlets have a similar relationship to servers as applets have to browsers. The term 'applet' usually refers to a Java applet that executes from within a Web browser. The term 'servlet' usually refers to a Java servlet that executes from within a Web server environment. Java servlets are often used as an alternative to Common Gateway Interface or CGI programs. The biggest difference between the two is that a Java applet is persistent. When a servlet is started, it stays in memory and can fulfill multiple requests. In contrast, a CGI program terminates when it has fulfilled a request. The persistence of Java applets makes them faster because there's no wasted time in setting up and tearing down a servlet process.

"Signature" refers to a pattern of types, such as return types, variable types, or argument types, that characterizes a Java object such as a member variable or a member method. For example, the general form of a signature for a member method is "argument-types)return-type," and the general form of a member variable signature is "member variable type." That is, for example, a member method declared as "public static void main(String args[])" has the signature "([Ljava/lang/String;)Void," where the "[" is a Java convention indicating that the argument type is an array. Similarly, for example, a string variable declared as "String Mystring" has the signature "Ljava/lang/String;".

"URL" means Uniform Resource Locator, a standard method of associating World Wide Web data locations with network addresses for data communications.

A "wizard" is a utility program that helps perform a particular task within an application. For example, a "letter wizard" within a word processing application would lead a user through the steps of producing different types of correspondence. "Software development wizards," utilities for performing particular tasks in software development applications, are generally part of typical embodiments of the present invention. Software development applications include, for example, so-called Integrated Development Environments or "IDEs."

"World Wide Web," or more simply "the web," refers to the well-known system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

Detailed Description

Embodiments of the present invention typically include automated supports for software development, such as IDEs and wizards, where configuration information is derived from both user input and application software itself, persistently saved in descriptor files (typically based upon XML), and later reloaded and integrated ("round-tripped") to maintain current configuration information about a software application. More specifically, turning to FIG. 1, exemplary embodiments of the invention are seen to include methods of software development. One example embodiment shown in FIG. 1 includes determining (102), through Java reflection API calls (124), a current software signature (126) for each Java object, from a Java software application (118) including Java application code (120), to be administered by a software development wizard (116), and retrieving (104) from a deployment descriptor (128) a Java object deployment description (132) for each said Java object.

Further as shown in FIG. 1, exemplary embodiments include detecting (106) changes (134) in the Java application code, where detecting changes typically includes contrasting (108) the current software signatures (126) and the retrieved Java object deployment descriptions (132). Some embodiments include displaying (110), for user revision through a user interface (138), representations (139) of the changes (134) in the Java application code, that is, in the Java objects whose current software signatures are different from their Java object deployment descriptions. In such embodiments, user revision (136) typically includes user confirmation of detected changes (137). Such embodiments typically include recording (112) user revisions (136, 137) in the deployment descriptor (128), and conforming (114) the Java application code (120) to the user revisions (136, 137).

Figure 2:
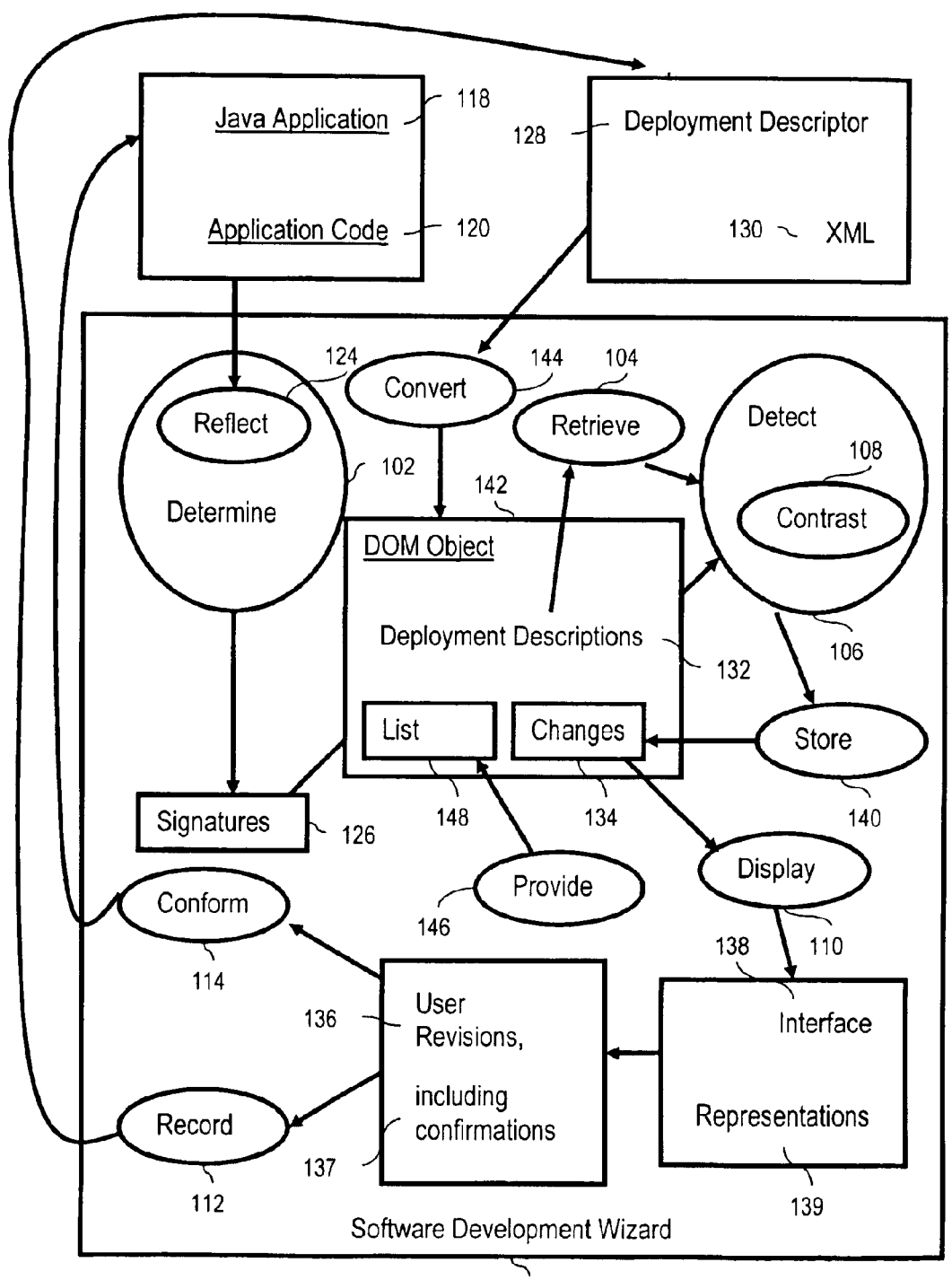
FIG. 2 is a control flow diagram illustrating further exemplary embodiments of the invention.

In exemplary embodiments of the kind illustrated in FIG. 2, the deployment descriptor (128) typically comprises an XML file (130). Exemplary embodiments typically include converting (144) the XML file to a DOM object (142), the DOM object typically stored in computer memory, and providing (146), in the form of entries in the DOM object (142), a list (148) of the Java objects to be administered by a software development wizard.

In such embodiments, determining (102), through Java reflection API calls (124), a current software signature (126) for each Java object to be administered by a software development wizard (116), in this kind of embodiment, typically comprises determining current software signatures for the Java objects on the list (148) of the Java objects to be administered by a software development wizard. Retrieving (104) from a deployment descriptor (128) a Java object deployment description (132) for each said Java object, in this kind of embodiment, typically comprises retrieving deployment descriptions for the Java objects on the list (148) of the Java objects to be administered by a software development wizard.

Retrieving (104) Java object deployment descriptions from a deployment descriptor in such embodiments also typically includes retrieving the deployment descriptions indirectly from the deployment descriptor through the DOM object, or more specifically, at the time of the retrieval, they are retrieved directly from the DOM object. That is, retrieving deployment descriptions from a deployment descriptor in such embodiments typically includes retrieving deployment descriptions from a DOM object. Many such embodiments include storing (140) detected changes (134) in the form of entries in the DOM object (142).

Figure 3:
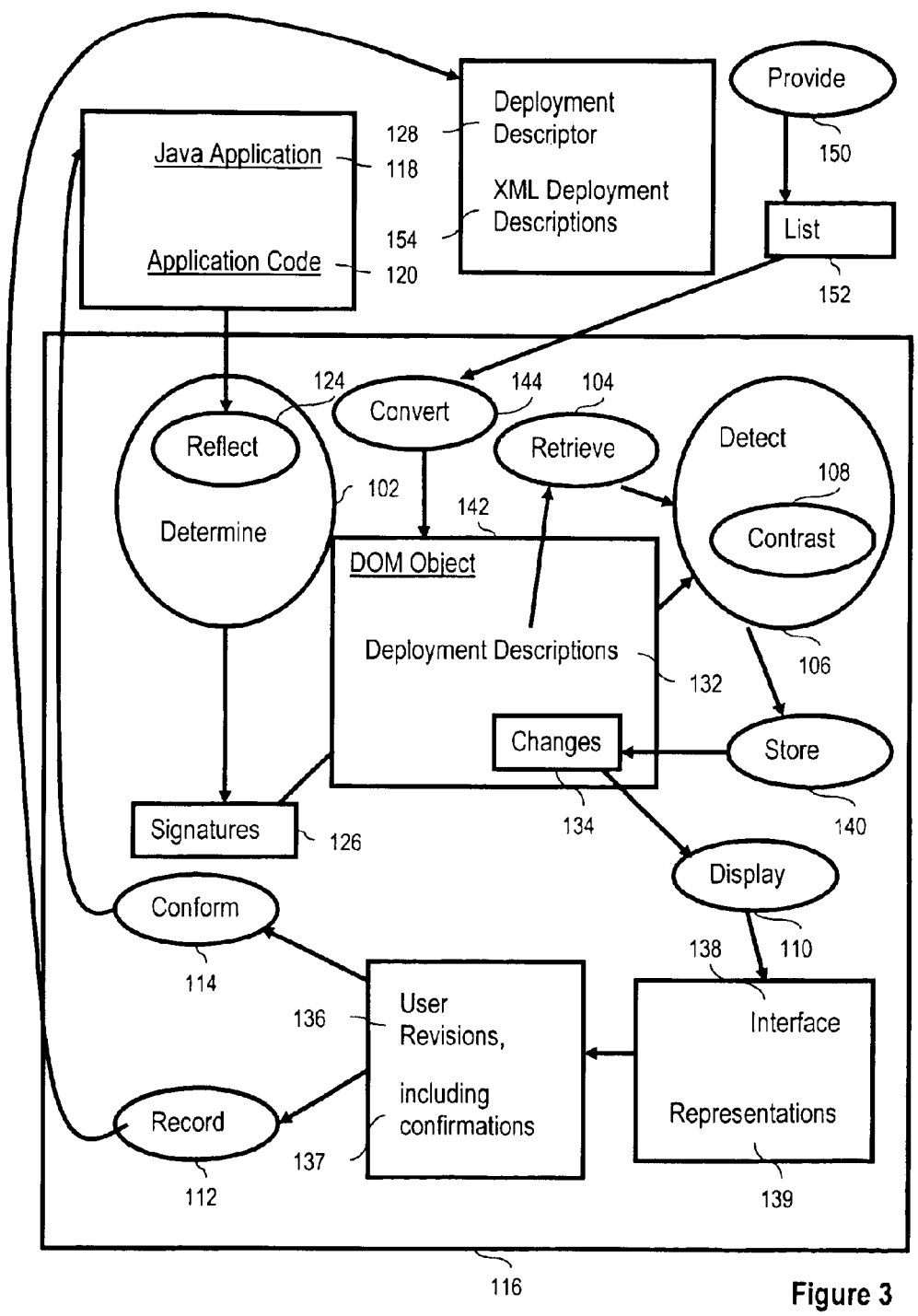
FIG. 3 is a control flow diagram illustrating further exemplary embodiments of the invention.

In exemplary embodiments of the kind illustrated in FIG. 3, the deployment descriptor (128) typically includes XML deployment descriptions (154). Embodiments according to FIG. 3 typically include providing (150) a list (152) of the Java objects to be administered by a software development wizard. Some embodiments include converting (144) the XML deployment descriptions to a DOM object (142) in computer memory in dependence upon the list (152) of Java objects to be administered by a wizard, whereby the only XML deployment descriptions converted into the DOM object (142) are XML deployment descriptions for Java objects to be administered by a wizard. Such embodiments often include storing (140) detected changes (134) in the form of entries in the DOM object. An advantage of such embodiments is that the DOM object is conveniently passed from function to function, containing as it does most of the operating data needed by this kind of embodiment, similar to the use of the DOM object illustrated in the example pseudocode set forth below in this specification.

We turn now to discussion of an additional exemplary embodiment, a telecommunications application software development wizard, referred to for convenience as a "telecom wizard." The telecom wizard aids development of SLEE based Telecom Services, referred to generally in this specification as "a telecom application." The example telecom wizard uses several mechanisms to compare and integrate data both from saved configuration data and from introspection of telecom application software to identify changes then subsequently make the corresponding changes in other required locations such as deployment descriptor files or source code repositories.

The telecom wizard includes user interface dialog panels, typically a series of them, that display the configurable items within the telecom application. The configurable items are the Java objects to be administered by the telecom wizard. The telecom wizard provides user input mechanisms through a graphical user interface to modify, update, remove, and add other configurable items. For example, the telecom wizard manages the creation of telecom event handlers, which follow specific guidelines, as defined in the JAIN SLEE Specification, JTCAP and JCC Specifications.

The telecom wizard typically allows such event handlers to be generated automatically in a telecom application, but with additional, required configuration information being generated in a deployment descriptor. The deployment descriptor in typical embodiments is an XML based file that defines the configurable items associated with a corresponding telecom application and defines how the telecom application will be deployed, installed, configured, and loaded.

The telecom wizard, on a subsequent invocation, such as an invocation of the telecom wizard to export the telecom application, reads the previously stored configuration information from the deployment descriptor. It also inspects the source code of the telecom application using introspection. The code of the telecom application may have had direct changes coded by a programmer. Such direct changes, because they are made outside any IDE or wizard are not properly integrated with other elements of the telecom application, including particularly the deployment descriptor. The telecom wizard identifies any new or changed elements of configurable items in the telecom application code, that are missing or inconsistent with their corresponding deployment descriptions in the deployment descriptor.

The deployment descriptions in the deployment descriptor and the information, mostly object signatures, derived from introspection of the telecom application is stored internally by the telecom wizard in a DOM data structure or 'DOM object.' The DOM object is a runtime representation of the XML, where the structure of the configurable items and their attributes are maintained.

The telecom wizard contrasts, that is, looks for differences, between the signatures of configurable items reflected from the telecom application code and the corresponding deployment descriptions in the deployment descriptor and presents the results of the contrast to the programmer, including any new or inconsistent changes to the source code. This enables the programmer to review the configuration before the telecom application is actually deployed and to make changes and corrections to the deployment descriptor to ensure that the deployment configuration recorded in the deployment descriptor is consistent with the telecom application source code.

The configurable items managed by the telecom wizard include, for example, TCAP Event Handlers (which are based on conventional method signatures and indicate which TCAP events need to be routed to the software components), JCC (Java Call Control) Event Handlers (similar concept as TCAP), Custom Events, Utility packages (when references in the software to certain utility packages are found, the telecom wizard generates custom versions of those utilities (similar to a C++ template, where when used, the telecom wizard generates or includes the appropriate specialization of toolkit provided utility classes), CMP Fields (Container Managed Persistent) fields which are data items in the software that the software container running within a server execution environment manages, and Customized Activity Context objects which are objects that derive from the ActivityContext interface. Each of these different kinds of configurable items, in order to function properly, requires changes in the Java application code as well as corresponding changes in the deployment descriptor. These changes would need to be kept in sync when changed in one or the other place, hence the need for intelligent processing.

This synchronization is carried out by the telecom wizard for changes effected through the telecom wizard, but there is nothing to stop a programmer from manually adding code to the telecom application which adds or changes event handlers or any of the other configurable items. Since the dependencies between the source code and the deployment descriptor may not be immediately apparent to the programmer unless they have much experience and knowledge about the software and the development domain, problems and inconsistencies can easily arise. Therefore if, in a subsequent invocation of a telecom wizard, the inconsistencies between the telecom application code and the deployment descriptor are presented to a programmer, the programmer can more easily review the accuracy of the results, resolving any of the inconsistencies before they become problems in deployment.

Introspection on the telecom application software is done to determine whether a programmer has inserted, removed or modified configurable items in the telecom application that require additional corresponding changes in the deployment descriptor. The telecom wizard is specialized for operations regarding SLEE based telecom applications, and there are therefore known to the telecom wizard the classes comprising configurable items. These known classes are not necessarily known by name, but they do conform to specific object oriented constructs, such as inheriting from known base classes, and they do conform to particular telecom-related signatures. Within each of these classes in question, there typically are particular methods or fields that relate to configurable items within the particular telecom application. Again the specific method names typically are not known, although the methods do conform to specific signatures. These signatures are not typically comprised by primitive types, but particular complex classes that derive from known base classes, in particular orders.

More specifically, the signatures comprising configurable items typically will not have such simple forms as "int" for an integer member variable. Instead, a member variable comprising a configurable item typically has a more recognizable signature such as "CMPInteger," representing a Container Managed persistent field. Similarly, a member method comprising a configurable item typically does not have a simple signature such as "(Ljava/lang/String;I)Void." Instead, a member method comprising a configurable item, such as a telecom event handler, typically has a more recognizable signature such as "(Ljain/protocol/ss7/tcap/component/InvokeIndEvent;Integer;Ljain.application.slee.service.ActivityContext)Void." That is, the method represented by this example event handler signature has three parameters, an event object, an integer, and an activity context object. Persons of skill in the art will recognize that ordinarily in Java syntax the Integer variable type is represented merely by an "I" and the Void return type is represented by a "V," but we have spelled them out for additional clarity in this example.

That is, when introspecting the telecom application to determine the existence of a particular type of event handler, that event handler can have any method name, but will certainly have a specific signature, a specific number and type of parameters, such as a specific event type, activity context and session identifier. If the method is found, then the telecom wizard contrasts the corresponding deployment description to identify any changes. If the sought method does not exist in the telecom application, the telecom wizard determines that fact and presents it to a programmer for resolution, thus assuring that the deployment descriptor is also set up properly. Based on the programmer's changes to the Deployment Descriptor, User Interface, or the telecom application software itself, automated changes to the telecom application, the deployment descriptor, or the user interface may result, in order to complete the intention of the programmer, thereby being a development and productivity aid.

So in summary it is seen that the example of the telecom wizard includes a user interface that presents to a programmer a view of configurable items within a telecom application that is being developed for eventual deployment. The telecom wizard derives the information for this view by using the actual telecom application software, including the source code, as well as a deployment descriptor to store information. These files may be individually modified by a programmer who is developing the telecom application. The telecom wizard, in support of consistency between the telecom application code and the deployment descriptor, analyzes both the telecom application code and the information stored in the deployment descriptor, records appropriate modifications in either to fulfill the programmer's intensions, and then displays the updated information to the programmer, so that the programmer can confirm that the recorded modifications are correct and intended. Technologies such as XML and Java are used to perform this analysis and store the persistent data. Java contains some software facilities, reflection classes and methods, for doing introspection, which is the process of analyzing Java software to locate software objects such as packages, classes, fields, methods, parameters, and so on. Telecom wizards in accordance with the present invention typically are implemented using a Java-based IDE, although other embodiments do use other programming languages including particularly C++.

For an even more specific explanation of the invention, a segment of pseudocode is presented below. At least some embodiments of the present invention are implemented as illustrated by the following segment of pseudocode.

```
static DOMObject config;
// The jPackage parameter is the Java package that contains software
// that this development tool is going to generate software for. Additional,
// meta-data or configuration data is stored, external to the software source,
// in the Deployment Description which is typically an XML file.
public void displayConfiguration(         String jPackage,
                                          String xmlPath,
                                          ItemList ConfigItems)
{
    config = integrateConfiguration (jPackage, xmlPath, ConfigItems);
    // update user interface fields with current configuration
    FinalConfig = initializeUserinterface (config);
    // update the deployment descriptor and the application
    updateConfiguration (String jPackage, String xmlPath, DOMObject FinalConfig)
}
public DOMObject integrateConfiguration(       String jPackage,
                                               String xmlPath,
                                               ItemList ConfigItems)
{
    // initialize a new DOM object from persistent data stored in the xmlPath
    // including deployment descriptor and list of configurable items
    // Note: this example includes in the DOMObject all deployment
    // descriptions in the deployment descriptor and a list of configurable
    // items. Other embodiments load the DOMObject in dependence upon
    // the list of configurable items so that the DOMObject contains
    // deployment descriptions only for configurable items without
    // the list itself, because the list would be redundant in such
    // embodiments.
    DOMObject c = new DOMObject( )
    c.load (xmlPath, ConfigItems);
    // Introspect the software
    introspect (c, jPackage);
    // Return the integrated DOMObject for display in the user interface
    return c;
}
```

-continued

```
public DOMObject void introspect (DOMObject c, String jPackage)
{
    // Enumerate classes of the specified package, and methods of the classes, and
    // look for particular configurable items that we are going to manage
    // in this Wizard. These configurable items are typically classes,
    // member variables, and methods with particular signatures
    // (naming conventions and parameter number and types)
    // The configurable items for this implementation are specifically
    // identified in the DOMObject c.
    // If a configurable item is found in the software, then look it up in the DOMObject,
    // and verify that its attributes are correct, if not, correct them, or optionally add an
    // entirely new element in the DOMObject structure.
    // Although some embodiments treat the list of changes as a separate
    // object, in this example, the changes are recorded in the DOMobject c.
    return c;
}
public DOMObject initializeUserInterface(DOMObject config)
{
    // start user interface
    // present the changes recorded in the DOMOjbect for
    // confirmation or additional edits, and
    // return the confirmations and additional edits
    return(config);
}
public void updateConfiguration (String jPackage, String xmlPath, DOMobject FinalConfig)
{
    // update the DOM configuration object with user input information
    // That is, integrate changes in the change list in the DOMObject
    // into the deployment descriptions in the DOMObject
    updateDOM (FinalConfig);
    // save DOM
    config.save(xmlPath, FinalConfig);
    // generate new software to match new elements in the DOM structure
    generateCode (jPackage, FinalConfig);
}
public void generateCode (String jPackage, DOMObject FinaConfig)
{
    // Enumerate elements of the DOM
    // For new elements specified in the user interface, that did not exist in the software
    // Generate a software template for the new Tag
    // Generate changes in the application source code
}
```

The calling sequence for the member methods illustrated in the example pseudocode begins with displayConfiguration( ). DisplayConfiguration( ) calls integrateConfiguration( ) passing a pointer to a deployment descriptor and a list of configurable items. IntegrateConfiguration( ) loads the deployment descriptor into a DOMObject along with the list of configurable items and calls introspect( ), passing the DOMObject containing the deployment descriptor and the list of configurable items.

Introspect( ) receives in DOMObject c both the deployment descriptor, including deployment descriptions for all configurable items, and a listing of all configurable items. Alternatively, in some embodiments, DOMObject c contains deployment descriptions only for configurable items, in which embodiments, no separate list of configurable items is presented because it would be redundant. Introspect( ) calls reflection methods to obtain current signatures from the application source code for all configurable items and identifies changes by comparing or actually contrasting the reflection returns with the corresponding deployment descriptions. Introspect( ) records the identified changes back into the DOMObject c and returns the DOMObject c to the calling method, in this case, eventually, back to displayConfiguration( ).

DisplayConfiguration( ) calls initializeUserInterface( ), passing the DOMObject, to start the user interface, present the changes recorded in the DOMObject for confirmation or additional edits, and return the confirmations and additional edits to displayConfiguration( ). The DOMObject is called "config" in the call to initializeUserInterface( ) and is called "FinalConfig" in the return from initializeUserInterface( ).

Upon return from initializeUserInterface( ), displayConfiguration( ) calls updateConfiguration( ). UpdateConfiguration( ) integrates all the changes into the deployment descriptions in the DOMObject through updateDOM( ) and then writes the updated deployment descriptions back out to the deployment descriptor at the xmlpath through config.save( ). UpdateConfiguration( ) then calls generatecode( ) to make the needed changes in the application source code to complete the synchronization of the source code with the deployment descriptor.

It will be understood from the foregoing descriptions that various modifications and changes may be made in the exemplary embodiments of the present invention without departing from the true spirit of the invention. This description is for purposes of illustration only and is not to be construed in a limiting sense. The scope of this invention is limited only by the language of the following claims.

What is claimed is:

1. A method of software development comprising the steps of:
   determining, through Java reflection API calls, a current software signature for each Java object, from a Java software application comprising Java application code, to be administered by a software development wizard;
   retrieving from a deployment descriptor a Java object deployment description for each said Java object;

detecting changes in the Java application code, wherein detecting changes includes contrasting the current software signatures and the retrieved Java object deployment descriptions;

displaying, for user revision through a user interface, representations of the detected changes in the Java application code, wherein user revision includes user confirmation of detected changes;

recording user revisions in the deployment descriptor; and conforming the Java application code to the user revisions.

2. The method of claim 1, wherein the deployment descriptor comprises an XML file, the method further comprising converting the XML file to a DOM object.

3. The method of claim 2 further comprising providing, in the form of entries in the DOM object, a list of the Java objects to be administered by a software development wizard.

4. The method of claim 2 further comprising storing detected changes in the form of entries in the DOM object.

5. The method of claim 1, wherein the deployment descriptor comprises XML deployment descriptions, the method further comprising the steps of:

providing a list of the Java objects to be administered by a software development wizard; and converting the XML deployment descriptions to a DOM object in dependence upon the list of Java objects to be administered by a wizard;

whereby the only XML deployment descriptions converted into the DOM object are XML deployment descriptions for Java objects to be administered by a wizard.

6. The method of claim 5 further comprising storing detected changes in the form of entries in the DOM object.

7. A method of software development comprising the steps of:

providing a Java software application comprising Java application code which further comprises Java objects including classes, member methods, and member variables;

providing a list of Java objects, among the Java objects comprised within the Java application code, to be administered by a software development wizard;

providing a deployment descriptor for the Java application, wherein the deployment descriptor includes Java object deployment descriptions for Java objects to be administered by the software development wizard;

determining, through Java reflection API calls, a current software signature for each listed Java object;

retrieving from the deployment descriptor a Java object deployment description for each listed Java object;

detecting changes in the Java application code, wherein detecting changes includes contrasting the current software signatures and the retrieved Java object deployment descriptions;

displaying, for user revision through a user interface, representations of the detected changes in the Java application code, wherein user revision includes user confirmation of detected changes;

recording user revisions in the deployment descriptor; and conforming the Java application code to the user revisions.

8. The method of claim 7 wherein the deployment descriptor comprises an XML file and providing a deployment descriptor further comprises converting the XML file to a DOM object.

9. The method of claim 8 wherein providing a list of Java objects within the Java application code to be administered by software development wizard further comprises providing the list in the form of entries in the DOM object.

10. The method of claim 8 further comprising storing detected changes in the form of entries in the DOM object.

11. The method of claim 7 wherein the deployment descriptor comprises XML deployment descriptions and providing a deployment descriptor further comprises converting the XML deployment descriptions to a DOM object in dependence upon the list of Java objects to be administered by a wizard, whereby the only XML deployment descriptions converted into the DOM object are XML deployment descriptions for Java objects to be administered by a wizard.

12. The method of claim 11 further comprising storing detected changes in the form of entries in the DOM object.

13. A system of software development comprising:

means for determining, through Java reflection API calls, a current software signature for each Java object, from a Java software application comprising Java application code, to be administered by a software development wizard;

means for retrieving from a deployment descriptor a Java object deployment description for each said Java object;

means for detecting changes in the Java application code, wherein detecting changes includes contrasting the current software signatures and the retrieved Java object deployment descriptions;

means for displaying, for user revision through a user interface, representations of the detected changes in the Java application code, wherein user revision includes user confirmation of detected changes;

means for recording user revisions in the deployment descriptor; and means for conforming the Java application code to the user revisions.

14. The system of claim 13, wherein the deployment descriptor comprises an XML file, the system further comprising means for converting the XML file to a DOM object.

15. The system of claim 14 further comprising means for providing, in the form of entries in the DOM object, a list of the Java objects to be administered by a software development wizard.

16. The system of claim 14 further comprising means for storing detected changes in the form of entries in the DOM object.

17. The system of claim 13, wherein the deployment descriptor comprises XML deployment descriptions, the system further comprising:

means for providing a list of the Java objects to be administered by a software development wizard; and means for converting the XML deployment descriptions to a DOM object in dependence upon the list of Java objects to be administered by a wizard, whereby the only XML deployment descriptions converted into the DOM object are XML deployment descriptions for Java objects to be administered by a wizard.

18. The system of claim 17 further comprising means for storing detected changes in the form of entries in the DOM object.

19. A computer program product of software development comprising:

a recording medium;

means, recorded on the recording medium, for determining, through Java reflection API calls, a current software signature for each Java object, from a Java software application comprising Java application code, to be administered by a software development wizard;

means, recorded on the recording medium, for retrieving from a deployment descriptor a Java object deployment description for each said Java object;

means, recorded on the recording medium, for detecting changes in the Java application code, wherein detecting changes includes contrasting the current software signatures and the retrieved Java object deployment descriptions;

means, recorded on the recording medium, for displaying, for user revision through a user interface, representations of the detected changes in the Java application code, wherein user revision includes user confirmation of detected changes;

means, recorded on the recording medium, for recording user revisions in the deployment descriptor; and means, recorded on the recording medium, for conforming the Java application code to the user revisions.

20. The computer program product of claim 19, wherein the deployment descriptor comprises an XML file, the computer program product further comprising means, recorded on the recording medium, for converting the XML file to a DOM object.

21. The computer program product of claim 20 further comprising means, recorded on the recording medium, for providing, in the form of entries in the DOM object, a list of the Java objects to be administered by a software development wizard.

22. The computer program product of claim 20 further comprising means, recorded on the recording medium, for storing detected changes in the form of entries in the DOM object.

23. The computer program product of claim 19, wherein the deployment descriptor comprises XML deployment descriptions, the computer program product further comprising:

means, recorded on the recording medium, for providing a list of the Java objects to be administered by a software development wizard; and means, recorded on the recording medium, for converting the XML deployment descriptions to a DOM object in dependence upon the list of Java objects to be administered by a wizard;

whereby the only XML deployment descriptions converted into the DOM object are XML deployment descriptions for Java objects to be administered by a wizard.

24. The computer program product of claim 23 further comprising means, recorded on the recording medium, for storing detected changes in the form of entries in the DOM object.

* * * * *